United States Patent Office 3,544,492
Patented Dec. 1, 1970

3,544,492
SULFUR-CONTAINING CURING AGENTS
Ray D. Taylor, Brecksville, and Pyong-Nae Son, Parma Heights, Ohio, assignors to The B. F. Goodrich Company, New York, N.Y., a corporation of New York
No Drawing. Filed Dec. 4, 1967, Ser. No. 687,492
Int. Cl. C08b 33/00; C08d 9/10
U.S. Cl. 260—4      10 Claims

ABSTRACT OF THE DISCLOSURE

The resinous compositions obtained by the reaction of one or more olefins and a substituted s-triazine with sulfur have been found to be useful curing agents for unsaturated rubbers. The curing agents disclosed herein have the advantage of being able to withstand higher processing temperatures than previously known curing agents of the same type without the development of "bloom" when the undercured rubber stock is stored prior to vulcanization.

BACKGROUND OF THE INVENTION

Obtaining a uniform dispersion of elemental sulfur in rubber stock has been a serious problem for the rubber industry and one which has received a great deal of attention. Problems attributable to poor dispersion of sulfur in the rubber include: migration of the sulfur to the surface of the rubber stock—commonly referred to as "bloom"; decrease of tack at the surface of the rubber stock; variation of the physical properties of vulcanizates from batch to batch; overcure at the surface of vulcanizates; and others. These problems have been minimized through the use of sulfur-containing organic formulations as curing agents. For example, U.S. Pat. No. 2,399,694 discloses sulfur-containing compositions prepared by reacting excess quantities of sulfur with fractionated neutralized petroleum acid sludge products. Also, Hendry et al. in U.S. Pat. No. 3,259,598 teach the use of sulfur-olefin interpolymers as curing agents. More recently, interpolymers of sulfur, linseed oil and dicyclopentadiene or styrene have been disclosed in U.S. Pat. Nos. 3,259,598 and 3,264,239 as useful sulfur-containing curing agents.

The sulfur-bearing materials to be useful as curing agents should be compatible with the rubber stock and contain associated sulfur capable of being freed for utilization during the vulcanization of the rubber stock. If effective vulcanization and prevention of bloom are to be achieved, however, these curing agents must be able to withstand temperatures encountered during pre-vulcanization processing operations, such as milling, Banburying or extruding, without prematurely releasing their sulfur. Presently existing sulfur-containing curing agents while performing well at lower processing temperatures, below about 212° C., are not completely acceptable when subjected to more severe processing conditions as are often required for certain rubber stocks.

SUMMARY OF THE INVENTION

We have now discovered improved curing agents which are resinous compositions formed by the reaction of one or more olefinic materials and a s-triazine, substituted with three groups containing activated terminal unsaturation, and sulfur. Preferred curing agents are styrene or dicyclopentadiene, 1,3,5-triacrylyl perhydro-s-triazine and sulfur. The curing agents of this invention are useful in rubbery materials having available unsaturation, especially rubbery polymers of dienes or polyenes. The olefin/s-triazine/sulfur resin curing agents are particularly useful for rubbery materials subjected to processing temperatures greater than about 212° F. Processing at these higher temperatures is often desirable to reduce processing time or when working with difficultly processable rubber stocks. The materials of this invention when incorporated in a rubber stock can be subjected to these elevated processing temperatures without releasing the associated sulfur and therefore can be stored for prolonged periods with no trace of bloom or any of the associated objectionable features. The vulcanizates of this invention have physical properties comparable to those obtained with a conventional sulfur cure or with other sulfur-containing curing agents.

DETAILED DESCRIPTION

The s-triazines useful for the preparation of the resinous curing agents of this invention will have the formula

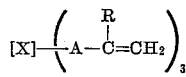

wherein X is s-triazine or perhydro-s-triazine; R is a hydrogen or methyl group; and A is a carbonyl group, an ether group or a methylene grouping

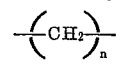

where $n$ is an integer from 1 to 4. The

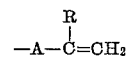

substituents may be attached to the perhydro-s-triazines through either the carbon or nitrogen atoms of the s-triazine ring. In addition to the above-mentioned substituents, there may also be substituted on the perhydro-s-triazines other groups such as alkyl or alkoxy radicals, an oxygen atom which is doubly bonded (=O) to the carbon atoms of the triazine ring, and the like. Isocyanurates, formed when the perhydro-s-triazine is substituted with three (=O) groups and three

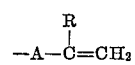

groups, are particularly useful materials of this latter type.

Preferred s-triazines useful of the present invention will have the structural formulae

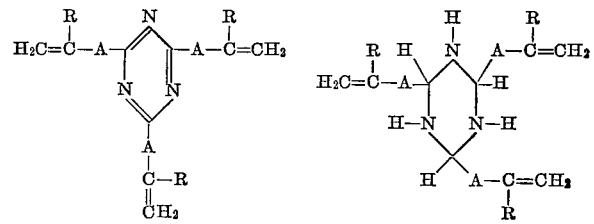

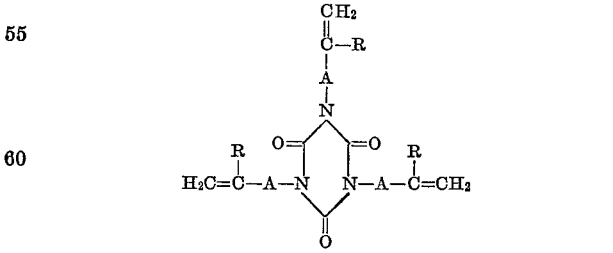

wherein R is a hydrogen or methyl group and A is a carbonyl group or methylene group. The most useful s-triazines, perhydro-s-triazines and isocyanurates for the purposes of this invention are tri-substituted with allyl, methallyl, acrylyl or methacrylyl groups.

Olefins which may be reacted with the substituted s-triazines include: alkenes and cycloalkenes, such as ethylene, propylene, butene-1, butene-2, isobutylene, isopentene, diisobutylene, triisobutylene, hexene-1, heptene-3, octene-1, dodecene-8, cetene-1, hexyl-2-decene-1, heptadecene-7, pentatriacontene-17, cyclopentene, cyclohexene; polyolefins, such as allene, butadiene, isoprene, chloroprene, cyclopentadiene, methylcyclopentadiene, dicyclopentadiene, vinyl cyclopentadiene, cyclohexadiene, vinyl norbornene, vinyl cyclohexene, ethylidene norbornene, methylene norbornene, methyl norbornadiene, methyl tetrahydroindene, 1,5-cyclooctadiene, 1,4-hexadiene, methyl-1,4-hexadiene, 1,4-heptadiene, 1,4,9-decatriene, dimethyl-1,4,9-decatriene; aralkenes, such as styrene, α-methyl styrene; unsaturated terpenes, such as pinene, camphene, alloocimene, myrcene; and the like. Particularly useful curing agents have been obtained when the olefin interpolymerized is a styrene, cyclopentadiene or dicyclopentadiene.

Although elemental sulfur is preferred in preparing the present curing agents, other sulfurizing agents containing at least two sulfur atoms per molecule, such as sodium polysulfide, diethyl tetrasulfide, hydrogen disulfide and sulfur monohalides, may be employed.

The resinous compositions are conveniently prepared by heating the sulfur to melting (about 115–120° C.) and adding the olefin and the s-triazine with stirring. The reactants are added to the molten sulfur individually, generally, the olefin first followed by the s-triazine after the initial reaction has subsided. This mixture is heated at a temperature of about 140° C. to 190° C., or more preferably from about 155° C. to 175° C., until the mixture becomes very viscous and stirring becomes difficult, usually about 1 to 4 hours.

The reaction may be conducted in bulk or an inert diluent can be employed if desired. Suitable inert diluents useful for the present process include benzene, toluene, xylene, chlorobenzene, carbon disulfide or the like. Catalysts may be employed to facilitate the formation of the resinous materials although they are not necessary. Useful curing agents are obtained when about 50–95 parts by weight of sulfur, 4–45 parts by weight olefin and 1–10 parts by weight of the s-triazine are reacted, however, it is preferred that the sulfur:olefin:s-triazine weight ratio in the reaction mixture be about 75–90:10–20:3–6. The sulfur-containing curing agents of the present invention will have a sulfur equivalent from about 0.6 to about 0.9.

The sulfur/olefin/s-triazine curing agents are generally useful for use in rubber stocks, both natural and synthetic which contain available unsaturation. Natural rubbers which can be used include natural, balata and gutta percha. Synthetic rubbery materials which can be used in the practice of this invention are polymeric diene rubbers such as polybutadiene-1,3, polyisoprene, poly-2,3-dimethylbutadiene-1,3, poly-2-chlorobutadiene-1,3 and the like. Polymeric diene rubbers containing at least 50% by weight of the diene, and more preferably about 55 to 85% by weight of the diene, also may be used. Such polymers include isobutylene-isoprene copolymers, butadiene-styrene copolymers, butadiene-acrylonitrile copolymers, butadiene-vinyl pyridene copolymers, butadiene-acrylic acid copolymers, butadiene-alkyl acrylate or methacrylate copolymers, butadiene-chlorostyrene copolymers, butadiene-methyl vinyl ketone copolymers, and the like. Copolymers, terpolymers and other multicomponent polymers containing at little as 35% by weight or less of the diene may also be employed. For example: polymers of about 35% by weight butadiene-1,3 and about 65% styrene and acrylonitrile; polymers of about 97% by weight isobutylene and about 3% isoprene; and polymers of about 70–50 mol percent ethylene, 30–50 mol percent propylene and 0.5–3 mol percent of a third monomer such as 1,4-hexadiene, 2-methyl-1,4-hexadiene, dimethyl-1,4,9-decatriene, dicyclopentadiene, vinyl cyclohexene, vinyl norbornene, ethylidene norbornene, norbornadiene, methyl tetrahydroindene and the like, can be used.

The amount of sulfur/olefin/s-triazine curing agent which can be effectively employed will range from about 0.25 to 20 parts by weight based on the polymer. Excellent results have been obtained with rubber stocks containing from 1 to 6 parts by weight of the curing agent.

To incorporate the curing agents of this invention into the rubber stocks, no special processing is required. They may be mixed in on a mill or in any other suitable mixing device such as a Banbury mixer or internal kneader. It is an important aspect of the present invention, however, that for certain difficulty processable rubber stocks which require longer processing times, higher processing temperature, or both, the sulfur/olefin/s-triazine curing agents can be employed with none of the disadvantages encountered with other sulfur-containing curing agents. The curing agents are compatible with other conventional compounding ingredients such as fillers, reinforcing agents, pigments, plasticizers, lubricants, anti-sticking agents, fungicides, resins, accelerators, antioxidants, antiozonants and the like, and will not alter the amount of these compounding ingredients customarily employed. The rubber stocks containing the sulfur/olefin/s-triazine curing agents, alone or with other appropriate compounding ingredients, may be cured at temperatures from about 266° F. to 392° F. Curing temperatures most commonly employed are from about 302° F. to 388° F.

The following examples serve to illustrate the invention more fully, however, they are not intended to limit the scope thereof. All parts and percentages are on a weight basis unless otherwise indicated.

EXAMPLE I

Sulfur (about 640 grams) was placed in a flask and heated until melted. To the melt, which was maintained at about 115° C., was added 83 grams of dicyclopentadiene. This mixture was heated at about 150–165° C. for about one hour with stirring. The viscous dark brown reaction mixture was then cooled to about 120° C. and the incremental addition of 33 grams of the 1,3,5-triacrylyl perhydro-s-triazine begun. Heating was then resumed and when after about 40 minutes the mixture became too viscous for stirring, the reaction was stopped and the contents of the reactor transferred into a dish to cool. After standing for several days, the product was ground and passed through 80 mesh screen. On heating, the sulful/dicyclopentadiene/1,3,5-triacrylyl perhydro-s-triazine curing agent softened at 100° C. and melted at 155° C.

EXAMPLE II

To demonstrate the effectiveness of the sulfur dicyclopentadiene/1,3,5-triacrylyl perhydro-s-triazine resin of Example I as a curing agent in a rubber stock, a rubber masterbatch was prepared according to the following recipe:

|   | Parts |
|---|---|
| Smoked sheet | 40.0 |
| SBR (23.5% styrene/76.5% butadiene) | 40.0 |
| Blended whole tire reclaim | 40.0 |
| FEF carbon black | 30.0 |
| Medium thermal carbon black | 10.0 |
| Mixture of high molecular weight oil-soluble sulfonic acid with a paraffin oil | 2.0 |
| Stearic acid | 2.0 |
| Zinc oxide | 3.0 |
| Pine tar | 3.0 |
| Beta-naphthyl-p-phenylenediamine | 1.5 |
| 2-(4-morpholinothio)benzothiazole | 1.4 |

172.9 parts of the rubber masterbatch and 3.75 parts of the sulfur/dicyclopentadiene/1,3,5-triacrylyl perhydro-s-triazine were mixed together on a rubber mill and the stress-strain data obtained after curing 302° F. for 30 minutes. The vulcanizate had a tensile of 1777 p.s.i., 200% modulus of 1070 p.s.i. and 307% elongation.

When the sulfur/dicyclopentadiene/1,3,5-triacrylyl perhydro-s-triazine was used as curing agent for styrene-butadiene copolymer (25/75), acrylonitrile-butadiene copolymer (33/67), isobutylene-isoprene copolymer (97/3), cis-1,4-polyisoprene and cis-1,4-polybutadiene, in all cases vulcanizates which cured readily and had good physical properties were obtained.

EXAMPLE III 40 parts natural rubber, 33 parts styrene-butadiene (25/75) copolymer and 25 parts cis-1,4-polybutadiene were mixed and compounded in accordance with a typical carcass stock recipe. The rubber stocks were compounded with equivalent amounts of curing agents and were identical in all other respects. 3.2 parts sulfur was employed as the curing agent for stock A while 4 parts of a sulfur/styrene/1,3,5-triacrylyl perhydro-s-triazine resin (prepared according to the procedure of Example I) was employed as curing agent for stock B. Stocks A and B were cured for 30 minutes at 302° F. to yield vulcanizates having the following physical properties:

|  | A | B |
|---|---|---|
| Tensile (p.s.i.) | 3,755 | 3,580 |
| 200% modulus (p.s.i.) | 2,047 | 2,355 |
| Elongation (percent) | 300 | 280 |

When the above example was repeated using a sulfur/1,5-cyclooctadiene/1,3,5-triacrylyl perhydro-s-triazine curing agent, a sulfur/dicyclopentadiene/triallyl cyanurate curing agent, a sulfur/dicyclopentadiene/1,3,5-triallyl-s-triazine-2,4,6(1H, 3H, 5H)-trione curing agent and a sulfur/styrene/1,3,5 - triallyl-s-triazine-2,4,6-(1H, 3H, 5H)-trione curing agent, similar physical properties were obtained for the vulcanizates.

EXAMPLE IV

Using the rubber masterbatch set forth in Example II, four rubber compositions were prepared with different but approximate equivalent amounts of curing agents including the sulfur/olefin/s-triazine compounds of our invention, conventional sulfur and a widely used commercial curing agent, so that a comparison could be obtained as to the extent of bloom for each stock when subjected to identical conditions. The four rubber compositions were prepared by milling together at 167° F. for 5–6 minutes the following ingredients:

|  | Parts |  |  |  |
|---|---|---|---|---|
|  | A | B | C | D |
| Rubber masterbatch | 172.9 | 172.9 | 172.9 | 172.9 |
| Curing Agent: |  |  |  |  |
| Sulfur | 3.0 |  |  |  |
| Sulfur/dicyclopentadiene/1,3,5-triacrylyl perhydro-s-triazine |  | 3.75 |  |  |
| Sulfur/styrene/1,3,5-triacrylyl perhydro-s-triazine |  |  | 3.75 |  |
| Sulfur/olefin/linseed oil* |  |  |  | 3.75 |

*A commercial curing agent.

The rubber compositions to be tested were prepared by milling the curing agents into the rubber masterbatch at 220° F. for 5 minutes. 3½ x 3½ inch samples of the 0.075 inch rubber sheets were then pressed between two pieces of polyester film for 5 minutes at 100° C. and 20,000 p.s.i. The polyester film was removed from one side of the rubber sample and the sample stored at room temperature for 32 days and visually inspected at regular intervals to determine the extent of bloom which had developed on the exposed surface of the rubber sample. The results of this test are set forth in Table I.

TABLE I

|  | Days of storage |  |  |  |  |
|---|---|---|---|---|---|
|  | 4 | 8 | 15 | 18 | 32 |
| Rubber composition: |  |  |  |  |  |
| A | 3 | 4 | 4 | 4 | 4 |
| B | 0 | 0 | 0 | 0 | 1 |
| C | 0 | 0 | 0 | 0 | 0 |
| D | 2 | 3 | 3 | 3 | 3 |

Note.—0=no bloom; 1=very slight bloom; 2=slight bloom; 3=moderate bloom; 4=heavy bloom.

All four compositions when cured for 30 minutes at 302° F. had comparable physical properties.

EXAMPLE V

To demonstrate the improved performance of the curing agents of the present invention in rubber stocks subjected to rigorous processing temperatures, the crystallization behavior of several curing agents in clear carcass elastomer was studied. The test elastomer was prepared by milling together 40 parts natural rubber, 33 parts styrene-butadiene copolymer (25/75) and 25 parts cis-1,4-butadiene for 5 minutes at 220° F. Four compositions were then prepared by adding to 98 parts of this elastomer (A) 3.0 parts sulfur; (B) 3.75 parts sulfur/dicyclopentadiene/1,3,5-triacrylyl perhydro-s-triazine; (C) 3.75 parts sulfur/styrene/1,3,5-triacrylyl perhydro-s-triazine; and 3.75 parts of a commercial sulfur/olefin/linseed oil curing agent. Samples of each of the four rubber compositions were pressed for 15 minutes at 212° F. and 284° F. between two pieces of cellophane and then allowed to stand at room temperature. The amount of crystallization which developed in the clear rubber sheets upon standing was noted and is reported in Tables II and III. The amount of crystallization is indicated in the tables as follows: 0=no crystallization; 1=very slight crystallization; 2=slight crystallization; 3=moderate crystallization; and 4=heavy crystallization.

TABLE II
Samples pressed at 212° F. for 15 minutes

|  | Days of storage |  |  |
|---|---|---|---|
|  | 4 | 11 | 17 |
| Rubber composition: |  |  |  |
| A | 2 | 4 | 4 |
| B | 0 | 0 | 0 |
| C | 0 | 0 | 0 |
| D | 0 | 0 | 0 |

TABLE III
Samples pressed at 284° F. for 15 minutes

|  | Days of storage |  |  |
|---|---|---|---|
|  | 5 | 12 | 14 |
| Rubber composition: |  |  |  |
| A | 3 | 4 | 4 |
| B | 2 | 3 | 3 |
| C | 1 | 2 | 2 |
| D | 2 | 4 | 4 |

The above examples clearly demonstrate the utility of the sulfur/olefin/s-triazine curing agents of the present invention. These curing agents can be employed in a wide variety of rubber stocks and the resulting vulcanizates will have physical properties comparable to those achieved with a conventional sulfur cure, but with none of the attendant disadvantages of these latter materials related to bloom. Rubber stocks containing the curing agents of this invention may be processed at temperatures as high as 266° F. prior to vulcanization without developing any appreciable bloom when allowed to stand for prolonged periods. The sulfur/olefin/s-triazine curing agents thus offer improved results over presently known commercial sulfur-containing curing agents.

We claim:
1. A composition comprising the reaction product of 50–95 parts by weight of sulfur, 4–45 parts by weight of an olefin, and 1–10 parts by weight of a s-triazine substituted with three groups containing activated terminal unsaturation of the formula

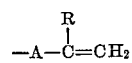

wherein R is a hydrogen or methyl group and A is a carbonyl group, an ether group or a methylene grouping.

2. A composition of claim 1, wherein the olefin contains about 6–14 carbon atoms and the s-triazine is selected from the group consisting of

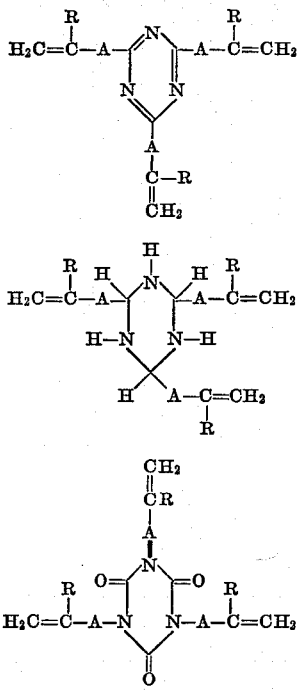

wherein R is a hydrogen or methyl group and A is a carbonyl group or a methylene grouping containing from 1 to 4 carbon atoms.

3. A composition of claim 2, wherein the olefin is selected from the group consisting of a styrene, cyclopentadiene or dicyclopentadiene.

4. A composition of claim 3, wherein the sulfur: olefin: s-triazine weight ratio is 75–90:10–20:3–6.

5. The method for preparing a sulfur-containing curing agent which comprises adding about 4–45 parts by weight of an olefin selected from the group consisting of a styrene, cyclopentadiene or dicyclopentadiene to about 50–95 parts by weight molten sulfur adding about 1–10 parts by weight of a s-triazine selected from the group consisting of

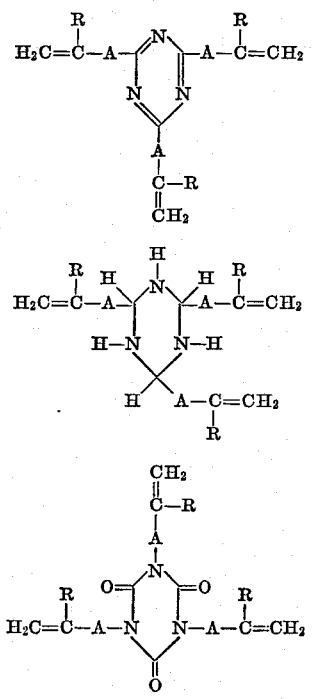

wherein R is a hydrogen or methyl group and A is a carbonyl group or a methylene grouping containing from 1 to 4 carbon atoms, to the viscous mixture formed above; and then heating the reaction mixture at about 140° C. to 190° C.

6. A composition comprising an unsaturated natural or synthetic polymer and from about 0.25 to 20 parts by weight based on 100 parts by weight of the polymer of a reaction product of 50–95 parts by weight of sulfur, 4–45 parts by weight of an olefin and 1–10 parts by weight of a s-triazine substituted with three groups containing activated terminal unsaturation of the formula

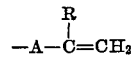

wherein R is a hydrogen or methyl group and A is a carbonyl group, an ether group or a methylene grouping.

7. A composition of claim 6, wherein the olefin contains from 6 to 16 carbon atoms, and the s-triazine is substituted with three groups containing activated terminal unsaturation of the formula

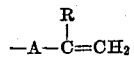

wherein R is a hydrogen or methyl group and A is a carbonyl group, an ether group or a methylene grouping.

8. A composition of claim 6, wherein the polymer is a polymeric diene rubber containing at least 50% of a diene monomer.

9. A composition of claim 8, wherein the weight ratio of sulfur:olefin:s-triazine is 75–90:10–20:3–6, the olefin is selected from the group consisting of a styrene, cyclopentadiene or dicyclopentadiene and the s-triazine is selected from the group consisting of

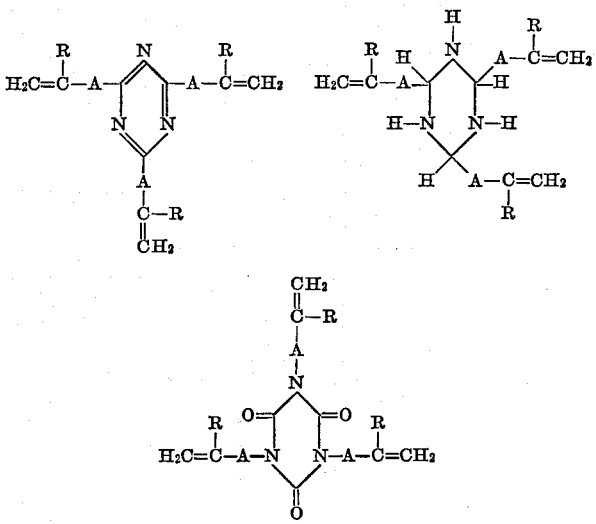

wherein R is a hydrogen or methyl group and A is a carbonyl grouping containing from 1 to 4 carbon atoms.

10. A composition of claim 9, wherein from about 1 to 6 parts by weight of the reaction product based on 100 parts by weight of the polymer is employed.

References Cited
UNITED STATES PATENTS

| | | | |
|---|---|---|---|
| 2,989,513 | 6/1961 | Hendry et al. | 260—79 |
| 3,250,772 | 5/1966 | Dexter et al. | 260—791 |
| 3,366,598 | 1/1968 | Westlinning et al. | 260—79 |

MURRAY TILLMAN, Primary Examiner

M. J. TULLY, Assistant Examiner

U.S. Cl. X.R.

260—5, 79, 79.5, 88.3, 779, 791, 887, 888, 889, 894, 897